(12) United States Patent
Dargude et al.

(10) Patent No.: US 9,900,330 B1
(45) Date of Patent: Feb. 20, 2018

(54) SYSTEMS AND METHODS FOR IDENTIFYING POTENTIALLY RISKY DATA USERS WITHIN ORGANIZATIONS

(71) Applicant: Veritas Technologies, Mountain View, CA (US)

(72) Inventors: Shailesh Dargude, Milpiltas, CA (US); Anand Athavale, San Jose, CA (US); Harshit Shah, Mumbai (IN); Ketan Shah, Sunnyvale, CA (US)

(73) Assignee: Veritas Technologies LLC, Mountain View, CA (US)

( * ) Notice: Subject to any disclaimer, the term of this patent is extended or adjusted under 35 U.S.C. 154(b) by 161 days.

(21) Appl. No.: 14/941,527

(22) Filed: Nov. 13, 2015

(51) Int. Cl.
*H04L 29/06* (2006.01)
*G06F 21/62* (2013.01)

(52) U.S. Cl.
CPC ...... *H04L 63/1425* (2013.01); *G06F 21/6218* (2013.01); *H04L 63/1416* (2013.01)

(58) Field of Classification Search
CPC .......................... H04L 63/1425; H04L 63/1416
See application file for complete search history.

(56) References Cited

U.S. PATENT DOCUMENTS

| | | | | |
|---|---|---|---|---|
| 6,769,066 B1 * | 7/2004 | Botros | ........... | G06F 21/55 700/110 |
| 7,856,494 B2 * | 12/2010 | Kulkarni | ........... | H04L 63/083 709/223 |
| 8,484,730 B1 * | 7/2013 | P. R. | ........... | G06F 11/3438 709/225 |
| 8,533,818 B1 * | 9/2013 | Ketterhagen | ........... | G06F 21/567 726/22 |
| 8,566,932 B1 * | 10/2013 | Hotta | ........... | G06F 11/00 726/2 |
| 8,776,168 B1 * | 7/2014 | Gibson | ........... | H04L 63/102 709/225 |
| 8,789,171 B2 * | 7/2014 | Osipkov | ........... | H04L 63/1408 726/22 |

(Continued)

OTHER PUBLICATIONS

Box; https://www.box.com/home, as accessed Oct. 8, 2015; (on or before Oct. 8, 2015).

(Continued)

*Primary Examiner* — Hadi Armouche
*Assistant Examiner* — Sher A Khan
(74) *Attorney, Agent, or Firm* — FisherBroyles LLP

(57) ABSTRACT

The disclosed computer-implemented method for identifying potentially risky data users within organizations may include (1) monitoring computing activity of a member of an organization with respect to the member's access to data related to the organization, (2) generating, based at least in part on the member's computing activity, a baseline representation of the member's access to the data, (3) detecting at least one attempt by the member to access at least a portion of the data, (4) determining that the member's attempt to access the portion of data represents an anomaly that is suspiciously inconsistent with the baseline representation, and then in response to determining that the member's attempt to access the portion of data represents the anomaly, (5) classifying the member as a potential risk to the security of the data. Various other methods, systems, and computer-readable media are also disclosed.

14 Claims, 7 Drawing Sheets

(56) References Cited

U.S. PATENT DOCUMENTS

| | | | | |
|---|---|---|---|---|
| 2004/0153663 | A1* | 8/2004 | Clark | G06Q 30/0185 |
| | | | | 726/25 |
| 2004/0198392 | A1* | 10/2004 | Harvey | H04L 63/107 |
| | | | | 455/456.1 |
| 2011/0296003 | A1* | 12/2011 | McCann | G06F 21/316 |
| | | | | 709/224 |
| 2012/0130724 | A1* | 5/2012 | Flegel | G06Q 40/06 |
| | | | | 705/1.1 |
| 2012/0246293 | A1* | 9/2012 | De Jager | G06F 21/552 |
| | | | | 709/224 |
| 2016/0103996 | A1* | 4/2016 | Salajegheh | G06F 11/3024 |
| | | | | 726/25 |
| 2016/0149941 | A1* | 5/2016 | Thakur | H04L 63/1425 |
| | | | | 726/23 |
| 2016/0261621 | A1* | 9/2016 | Srivastava | H04L 63/1425 |
| 2016/0330223 | A1* | 11/2016 | Sridhara | G06F 21/566 |

OTHER PUBLICATIONS

2015 Data Breach Investigations Report; Verizon Enterprise; http://www.verizonenterprise.com/DBIR/2015/, as accessed 10/8/15; (Apr. 2015).

Lance Spitzer; Honeypots: Catching the Insider Threat; Proceedings of the 19th Annual Computer Security Applications Conference; IEEE; https://www.acsac.org/2003/papers/spitzner.pdf; (Dec. 2003).

Alexander Liu, et al.; A Comparison of System Call Feature Representations for Insider Threat Detection; Proceedings of the 2005 IEEE Workshop on Information Assurance; http://citeseerx.ist.psu.edu/viewdoc/download?doi=10.1.1.133.1187&rep=rep1&type=pdf; (Jun. 2005).

Bradley J. Wood; An Insider Threat Model for Adversary Simulation. SRI International, Research on Mitigating the Insider Threat to Information Systems, 2, 1-3; (2000).

G. B. Magklaras, et al.; Insider Threat Prediction Tool: Evaluating the probability of IT misuse; Computers & Security, vol. 21 No. 1, pp. 62-73; https://www.researchgate.net/profile/George_Magklaras/publication/220614801_Insider_Threat_Prediction_Tool_Evaluating_the_probability_of_IT_misuse/links/09e41510079e1b9281000000.pdf; (2002).

Miltiadis Kandias, et al.; An Insider Threat Prediction Model; Trust, Privacy and Security in Digital Business; vol. 6264 of the series Lecture Notes in Computer Science; Proceedings of the 7th International Conference, TrustBus 2010; pp. 26-37; Springer; (Aug. 30-31, 2010).

Kathryn Laskey, et al; Detecting Threatening Behavior Using Bayesian Networks; http://citeseerx.ist.psu.edu/viewdoc/citations;jsessionid=601B1DADE098880B08EC55ACDB8B-DE8D?doi=10.1.1.3.5527; (2004).

Matt Wolff; Unsupervised Methods for Detecting a Malicious Insider; Proceedings of the 7th International ISCRAM Conference; http://www2.hawaii.edu/~wolffm/publications/wolffm_iscram10.pdf; (May 2010).

Adam J. Rocke, et al.; Mitigation of Insider Risks Using Distributed Agent Detection, Filtering, and Signaling; International Journal of Network Security, vol. 2, No. 2; pp. 141-149; (Mar. 2006).

Sunu Mathew, et al.; Insider Abuse Comprehension Through Capability Acquisition Graphs; 11th International Conference on Information Fusion; IEEE; (Jun. 30-Jul. 3, 2008).

Hoda Eldardiry, et al.; Multi-Domain Information Fusion for Insider Threat Detection; 2013 IEEE Security and Privacy Workshops; (2013).

* cited by examiner

SYSTEMS AND METHODS FOR IDENTIFYING POTENTIALLY RISKY DATA USERS WITHIN ORGANIZATIONS

BACKGROUND

Outsider attacks are not the only threats posed to the security of data belonging to an organization. Insider attacks may be just as, if not more, threatening due to the attacker's authorized access to the organization's networks and/or the target data itself. Such insider attacks often include and/or amount to fraud, data theft, exfiltration, or even sabotage.

Unfortunately, traditional data security solutions may be unable to accurately determine the intentions of users who access data within an organization, much less whether the users actually pose a threat to the security of the data. Moreover, since these users often have authorized and/or legitimate access to the data within the organization, traditional data security solutions may have difficulty thwarting insider attacks before an attacker is able to do irreversible damage to the organization. The instant disclosure, therefore, identifies and addresses a need for additional and improved systems and methods for identifying potentially risky data users within organizations.

SUMMARY

As will be described in greater detail below, the instant disclosure describes various systems and methods for identifying potentially risky data users within organizations. In one example, a computer-implemented method for identifying potentially risky data users within organizations may include (1) monitoring computing activity of a member of an organization with respect to the member's access to data related to the organization, (2) generating, based at least in part on the member's computing activity, a baseline representation of the member's access to the data related to the organization, (3) detecting at least one attempt by the member to access at least a portion of the data related to the organization, (4) determining that the member's attempt to access the portion of data represents an anomaly that is suspiciously inconsistent with the baseline representation, and then in response to determining that the member's attempt to access the portion of data represents the anomaly, (5) classifying the member as a potential risk to the security of the data related to the organization.

The method may include monitoring the computing activity of the member by tracking opcodes identified in connection with the member's access to the data related to the organization and/or tracking the number of unique files related to the organization that are accessed by the member per day. Additionally or alternatively, the method may include monitoring the computing activity of the member by identifying the number of files related to the organization for which the member has read or write permissions and/or tracking the number of alerts triggered in connection with the member's access to the data related to the organization. Furthermore, the method may include monitoring the computing activity of the member by tracking the number of policy violations committed by the member while accessing the data related to the organization and/or tracking the number of unique Internet Protocol (IP) addresses with which the member accesses the data related to the organization.

In one example, the method may also include identifying an amount of deviation between the member's attempt to access the portion of data and the baseline representation. In this example, the method may further include determining, based at least in part on the amount of deviation, that the member's attempt to access the portion of data represents the anomaly.

In one example, the method may also include calculating, based at least in part on the amount of deviation, a risk score for the member that represents a degree of risk posed by the member to the security of the data. In this example, the method may further include determining that the risk score for the member is above a riskiness threshold.

In one example, the method may also include determining current computing activity of the member based at least in part on the member's attempt to access the portion of data. In this example, the method may further include identifying one or more characteristics of the member's current computing activity. Additionally or alternatively, the method may include determining, by comparing the member's current computing activity with the baseline representation, the amount of deviation between at least one of the characteristics of the member's current computing activity and the baseline representation. Finally, the method may include weighting, within a mathematical formula that facilitates calculating the risk score for the member, a numerical value that represents the amount of deviation between the at least one of the characteristics of the member's current computing activity and the baseline representation.

In one example, the method may also include identifying at least one member group of the organization that includes the member. In this example, the method may further include identifying the number of members from the member group that have accessed the portion of data. Additionally or alternatively, the method may include determining that the number of members from the member group that have accessed the portion of data is below a minority threshold.

In one example, the method may also include identifying past attempts by the member to access the data related to the organization over a certain period of time. In this example, the method may further include generating, based at least in part on the past attempts by the member to access the data over the certain period of time, a baseline representation of the member's access to the data related to the organization.

In one example, the method may also include identifying recent attempts (such as the member's attempt to access the portion of data) by the member to access the data related to the organization over a recent period of time. In this example, the method may further include comparing the recent attempts by the member to access the data related to the organization with the baseline representation. Additionally or alternatively, the method may include identifying, based at least in part on the comparison, an amount of deviation between the recent attempts by the member to access the portion of data and the baseline representation. Finally, the method may include determining, based at least in part on the amount of deviation, that at least a portion of the recent attempts by the member to access the data are anomalous due at least in part to the portion of recent attempts being suspiciously inconsistent with the baseline representation.

In one example, the method may also include identifying the number of policy violations committed by the member while accessing the data related to the organization over the recent period of time. In this example, the method may further include determining, based at least in part on the number of policy violations, that at least a portion of the recent attempts by the member to access the data are anomalous.

In one example, the method may also include determining that the member's attempt to access the portion of data represents the anomaly based at least in part on one or more characteristics of the member's attempt. Examples of such characteristics include an opcode identified in connection with the member's attempt to access the portion of data, a file that the member is attempting to access, an alert triggered in connection with the member's attempt to access the portion of data, a policy violation committed in connection with the member's attempt to access the portion of data, an IP address with which the member accesses the data related to the organization, variations or combinations of one or more of the same, or any other suitable characteristics of the member's attempt.

As another example, a system for implementing the above-described method may include (1) a monitoring module, stored in memory, that monitors computing activity of a member of an organization with respect to the member's access to data related to the organization, (2) a baseline module, stored in memory, that generates, based at least in part on the member's computing activity, a baseline representation of the member's access to the data related to the organization, (3) a detection module, stored in memory, that detects at least one attempt by the member to access at least a portion of the data related to the organization, (4) a determination module, stored in memory, that determines that the member's attempt to access the portion of data represents an anomaly that is suspiciously inconsistent with the baseline representation, (5) a classification module, stored in memory, that classifies the member as a potential risk to the security of the data related to the organization in response to the determination that the member's attempt to access the portion of data represents the anomaly, and (6) at least one physical processor that executes the monitoring module, the baseline module, the detection module, the determination module, and the classification module.

As a further example, the above-described method may be encoded as computer-readable instructions on a non-transitory computer-readable medium. For example, a computer-readable medium may include one or more computer-executable instructions that, when executed by at least one processor of a computing device, may cause the computing device to (1) monitor computing activity of a member of an organization with respect to the member's access to data related to the organization, (2) generate, based at least in part on the member's computing activity, a baseline representation of the member's access to the data related to the organization, (3) detect at least one attempt by the member to access at least a portion of the data related to the organization, (4) determine that the member's attempt to access the portion of data represents an anomaly that is suspiciously inconsistent with the baseline representation, and then in response to determining that the member's attempt to access the portion of data represents the anomaly, (5) classify the member as a potential risk to the security of the data related to the organization.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
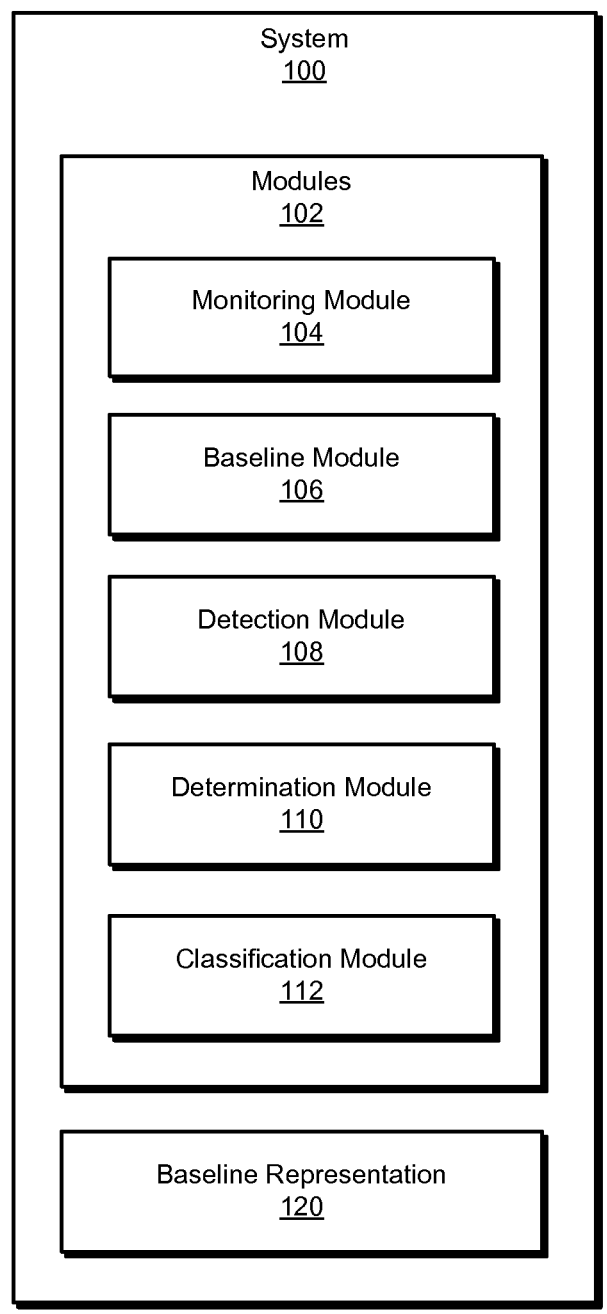
FIG. 1 is a block diagram of an exemplary system for identifying potentially risky data users within organizations.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for identifying potentially risky data users within organizations. As will be explained in greater detail below, by monitoring the computing activity of members of an organization with respect to those members' access to data related to the organization, the various systems and methods described herein may be able to create a baseline representation of the way that those members have interacted with the data over a certain period of time. The various systems and methods described herein may then compare the future computing activity of those members with the baseline representation to determine the amount of deviation between their past computing activity and their future computing activity.

In the event that the amount of deviation reaches a certain threshold (e.g., the computing patterns of a user have changed significantly in recent weeks), these systems and methods may identify and/or classify those users as having a high likelihood of malicious intentions and/or posing a real threat to the security of the organization's data. For example, these systems and method may be able to identify members of an organization who intend to defraud the organization, exfiltrate data from the organization, sabotage the organization, or who are currently in the process of carrying out one or more of the same. By identifying users with malicious intentions in this way, these systems and methods may be able to mitigate, thwart, and/or undermine the negative impact of insider attacks on the organization.

The term "organization," as used herein, generally refers to any collection of people who have a certain commonality and/or belong to a certain entity. Examples of organizations include, without limitation, corporations, government entities, military entities, businesses, security customer bases, schools, colleges, universities, institutions, associations, groups, collectives, think tanks, variations or combinations of one or more of the same, or any other suitable organizations.

The terms "user" and "member," as used herein, generally refer to any person that forms part of, is connected to, and/or is included in an organization. Examples of users and members include, without limitation, employees, contractors, personnel, workers, staff, volunteers, variations or combinations of one or more of the same, or any other suitable users or members.

Figure 2:
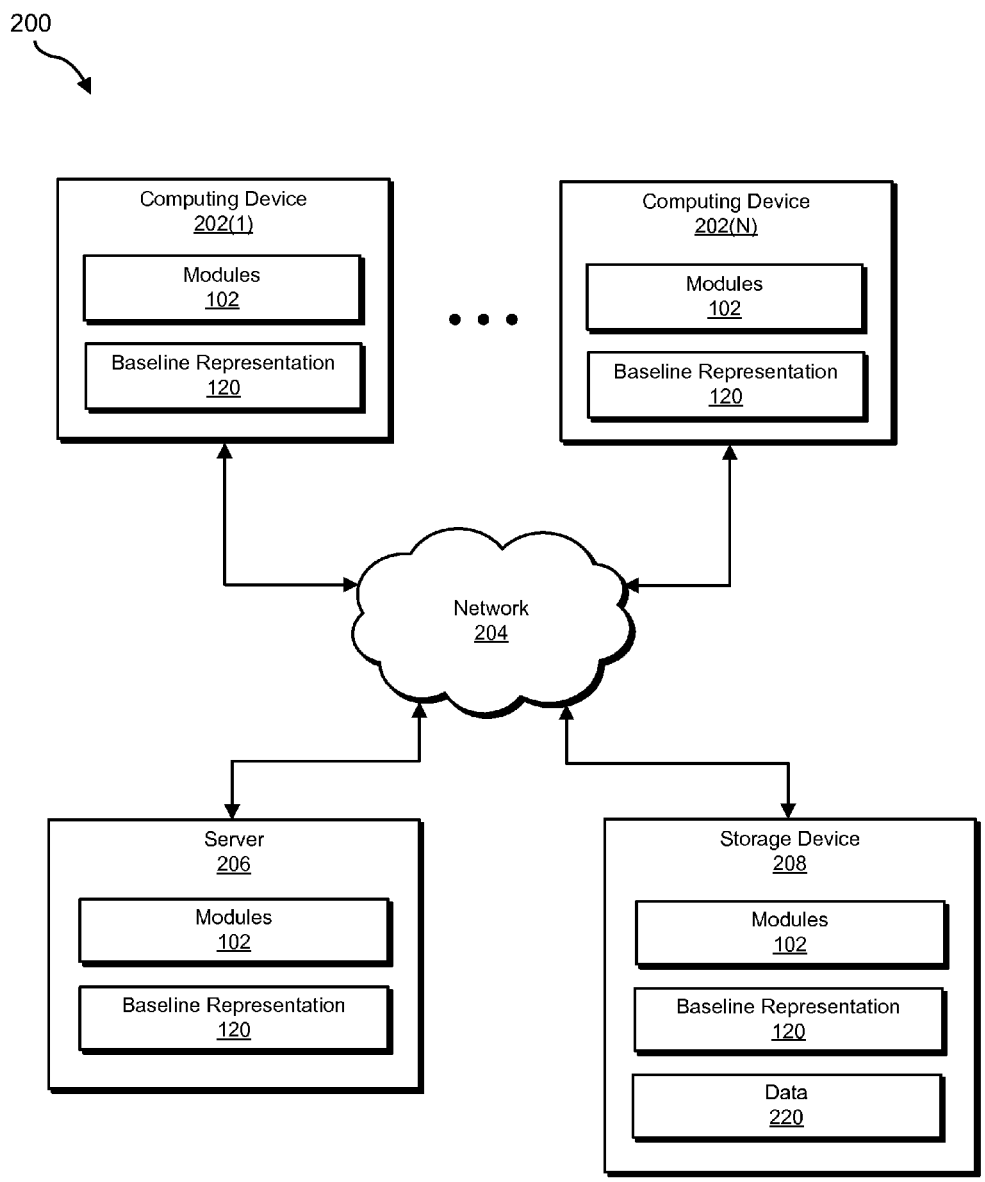
FIG. 2 is a block diagram of an additional exemplary system for identifying potentially risky data users within organizations.
Figure 4:
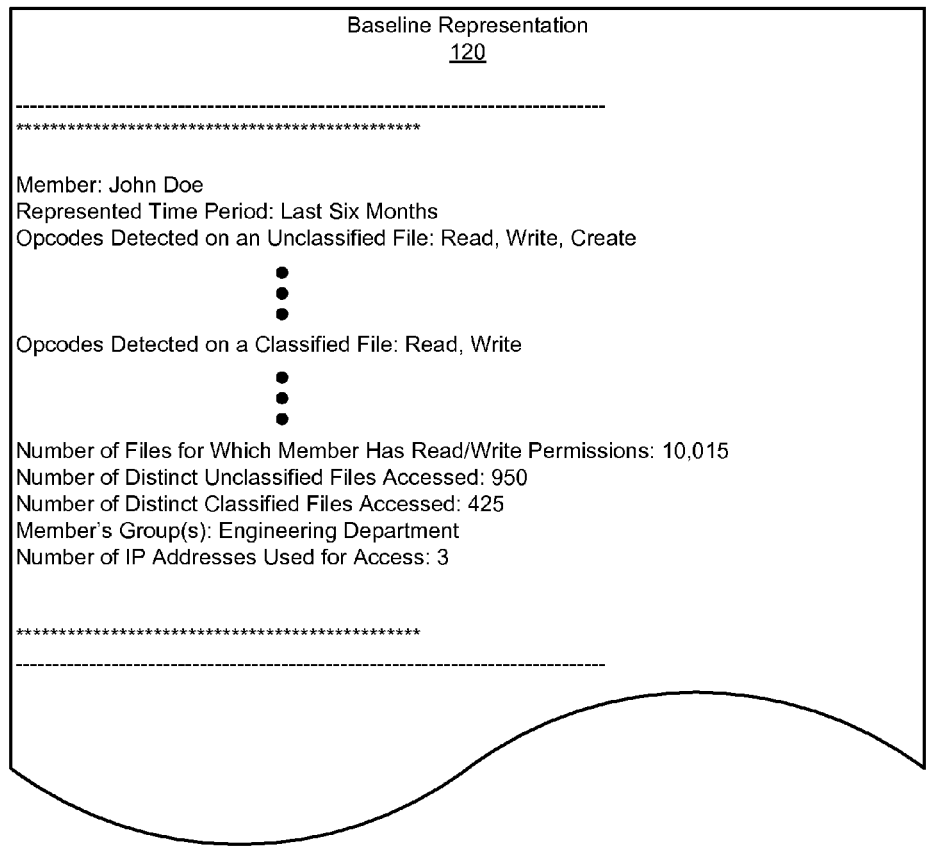
FIG. 4 is an illustration of an exemplary baseline representation of a user's access to data related to an organization.
Figure 5:
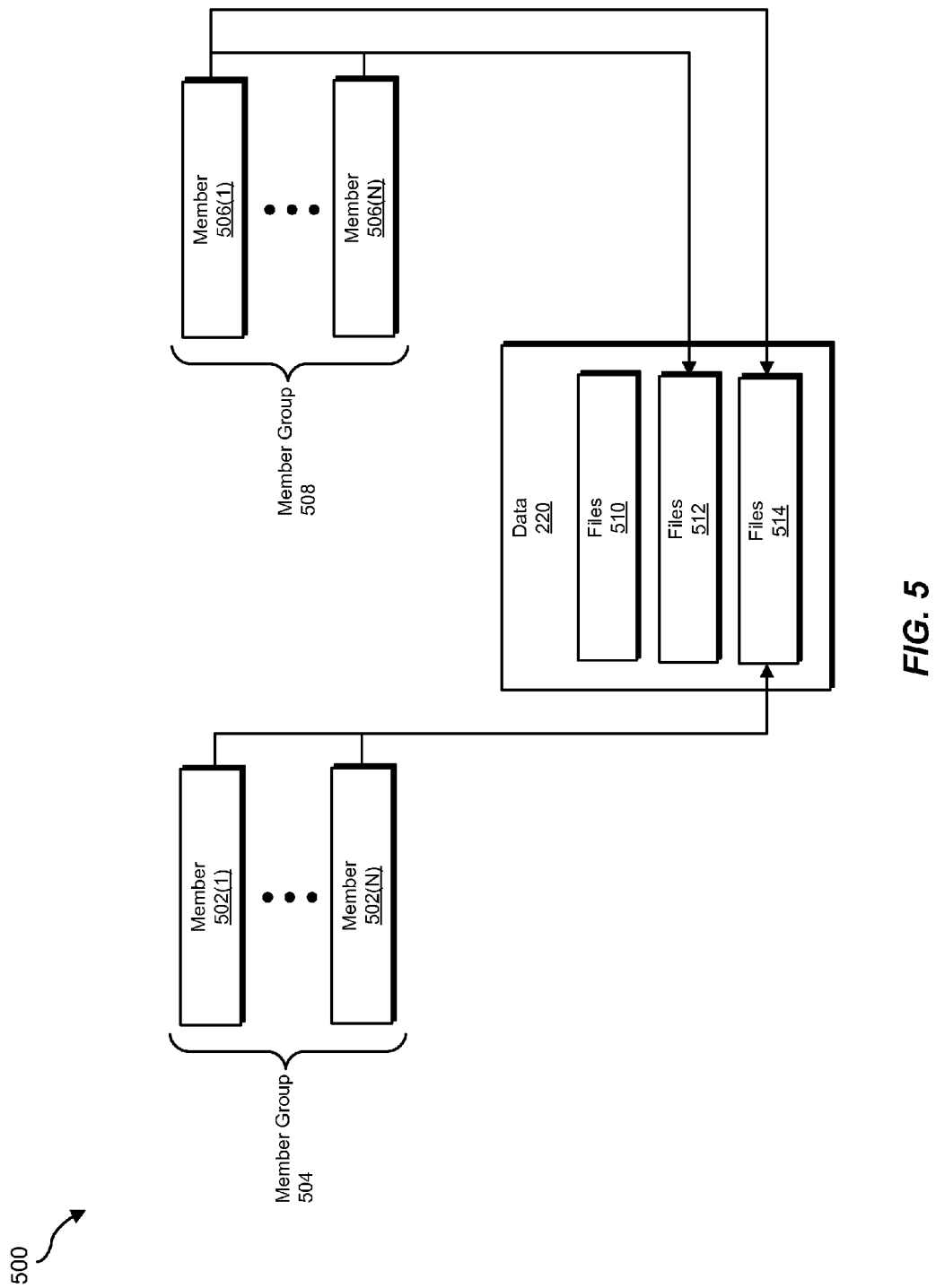
FIG. 5 is a block diagram of an additional exemplary system for identifying potentially risky data users within organizations.

The following will provide, with reference to FIGS. 1, 2, and 5, detailed descriptions of exemplary systems for identifying potentially risky data users within organizations. Detailed descriptions of corresponding computer-implemented methods will be provided in connection with FIG. 3. Detailed descriptions of an exemplary baseline representation will be provided in connection with FIG. 4. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for identifying potentially risky data users within organizations. As illustrated in this figure, exemplary system 100 may include one or more modules 102 for performing one or more tasks. For example, and as will be explained in greater detail below, exemplary system 100 may include a monitoring module 104 that monitors computing activity of a member of an organization with respect to the member's access to data related to the organization. Exemplary system 100 may also include a baseline module 106 that generates, based at least in part on the member's computing activity, a baseline representation of the member's access to the data related to the organization.

In addition, and as will be described in greater detail below, exemplary system 100 may include a detection module 108 that detects at least one attempt by the member to access at least a portion of the data related to the organization. Exemplary system 100 may further include a determination module 110 that determines that the member's attempt to access the portion of data represents an anomaly that is suspiciously inconsistent with the baseline representation. Moreover, exemplary system 100 may include a classification module 112 that classifies the member as a potential risk to the security of the data related to the organization in response to the determination that the member's attempt to access the portion of data represents the anomaly. Although illustrated as separate elements, one or more of modules 102 in FIG. 1 may represent portions of a single module or application (such as a Data Loss Prevention (DLP) solution and/or a network security solution).

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing devices 202(1)-(N), server 206, and/or storage device 208), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more baseline representations, such as baseline representation 120. In some examples, baseline representation 120 may include, identify, and/or represent the computing activity of an individual member of an organization, a group of members within an organization, and/or all members of an organization. Examples of the types of information identified in baseline representation 120 include, without limitation, opcodes detected in connection with a member's access attempts, the number of unique files accessed by a member per day, the number of files for which a member has read or write permissions, the number of alerts triggered in connection with a member's access attempts, the number of policy violations committed by a member during access attempts, the number of unique IP addresses with which a member accesses an organization's data, member groups that include a member of an organization, variations or combinations of one or more of the same, or any other suitable information. Although FIG. 1 illustrates only a single baseline representation, other embodiments may include and/or involve multiple baseline representations that correspond to the computing activity of members of an organization.

Exemplary system 100 in FIG. 1 may be implemented in a variety of ways. For example, all or a portion of exemplary system 100 may represent portions of exemplary system 200 in FIG. 2. As shown in FIG. 2, system 200 may include computing devices 202(1)-(N) in communication with a server 206 and/or a storage device 208 via a network 204. In one example, one or more of computing devices 202(1)-(N) may be programmed with one or more of modules 102. Additionally or alternatively, one or more of computing devices 202(1)-(N) may store and/or access baseline representation 120.

In one example, server 206 may be programmed with one or more of modules 102. In this example, server 206 may store and/or access baseline representation 120.

In one example, storage device 208 may be programmed with one or more of modules 102. Additionally or alternatively, storage device 208 may store and/or access baseline representation 120. Storage device 208 may also store and/or facilitate access to data 220.

In one embodiment, one or more of modules 102 from FIG. 1 may, when executed by at least one processor of one or more of computing devices 202(1)-(N) and/or server 206, cause that computing device and/or server 206 to identify potentially risky data users within organizations. For example, and as will be described in greater detail below, one or more of modules 102 may cause one or more of computing devices 202(1)-(N) and/or server 206 to (1) monitor computing activity of a member of an organization with respect to the member's access to data 220 related to the organization, (2) generate, based at least in part on the member's computing activity, baseline representation 120 of the member's access to data 220, (3) detect at least one attempt by the member to access at least a portion of data 220 related to the organization, (4) determine that the member's attempt to access the portion of data 220 represents an anomaly that is suspiciously inconsistent with baseline representation 120, and then in response to determining that the member's attempt to access the portion of data 220 represents the anomaly, (5) classify the member as a potential risk to the security of data 220.

Computing devices 202(1)-(N) each generally represent any type or form of computing device capable of reading computer-executable instructions. Examples of computing devices 202(1)-(N) include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing devices.

Server 206 generally represents any type or form of computing device capable of identifying potentially risky data users within organizations. Examples of server 206 include, without limitation, application servers, security servers, web servers, storage servers, deduplication servers, and/or database servers configured to run certain software applications and/or provide various security, web, storage, deduplication, and/or database services. Although illustrated as a single entity in FIG. 2, server 206 may alternatively include and/or represent multiple servers running within exemplary system 200.

Storage device 208 generally represents any type or form of storage device capable of storing, maintaining, and/or providing data. Examples of storage device 208 include, without limitation, storage servers, Solid-State Drives (SSDs), disk drives, storage arrays or clusters, disk arrays, tape drives, deduplication storage devices, backup storage devices, flash drives, memory devices, portions of one or more of the same, combinations of one or more of the same, or any other suitable storage device. Although illustrated as a single entity in FIG. 2, storage device 208 may alternatively include and/or represent multiple storage devices running within exemplary system 200. In one example, server 206 and storage device 208 may be separate and/or remote from one another. In another example, storage device 208 may represent a portion of server 206 (even though they are illustrated as separate and/or remote from one another in FIG. 2).

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless and/or wired connections. In one embodiment, network 204 may facilitate communication among computing devices 202(1)-(N), server 206, and/or storage device 208.

Data 220 generally represent any type or form of data, information, shares, folders, and/or containers related to an organization in one way or another. In one example, data 220 may include and/or represent a collection of files that belong to, are stored in connection with, and/or are accessible by an organization. Additionally or alternatively, data 220 may include and/or represent proprietary, classified, and/or confidential files whose disclosure could result in some form of harm to the organization and/or other parts of society. Moreover, data 220 may include and/or represent one or more shares, folders, and/or data containers that are maintained by storage device 208 and/or accessible to members of the organization.

Figure 3:
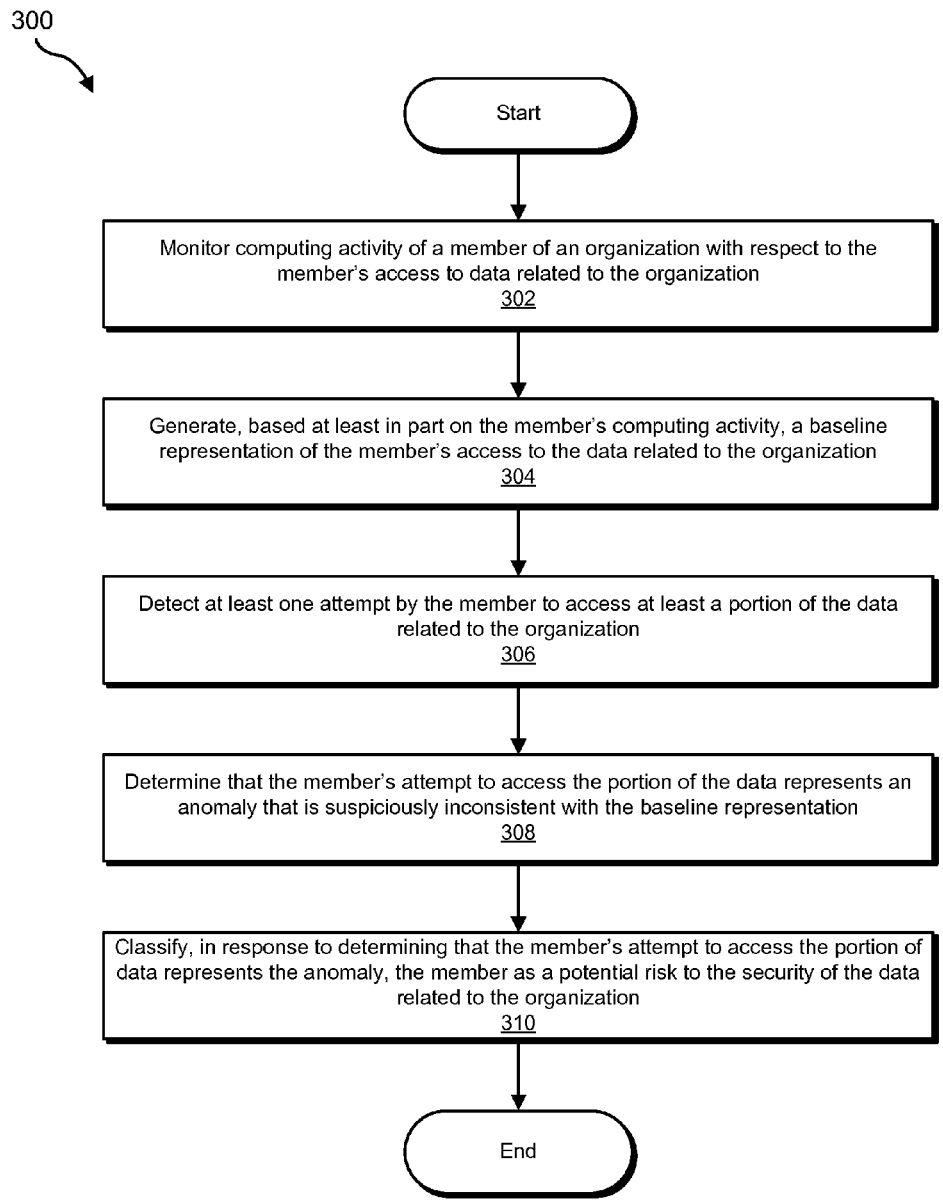
FIG. 3 is a flow diagram of an exemplary method for identifying potentially risky data users within organizations.

FIG. 3 is a flow diagram of an exemplary computer-implemented method 300 for identifying potentially risky data users within organizations. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may monitor the computing activity of at least one member of an organization with respect to the member's access to data related to the organization. For example, monitoring module 104 may, as part of one or more of computing devices 202(1)-(N), server 206, and/or storage device 208 in FIG. 2, monitor the computing activity of at least one member of an organization with respect to the member's access to data 220 related to the organization. In other words, monitoring module 104 may monitor any touches and/or accesses made by the member on data 220 using any of computing devices 202(1)-(N). The phrase "to access," as used herein in connection with data, generally refers to the process of performing any type or form of Input/Output (I/O) operation (including, e.g., reads, writes, creates, deletes, and/or changes in permissions) on such data.

The systems described herein may perform step 302 in a variety of ways. In some examples, monitoring module 104 may monitor the computing activity of the member by tracking certain access attempts by the member and/or keeping records that identify certain characteristics of those access attempts. In one example, monitoring module 104 may track the opcodes identified in connection with the member's successful attempts to access any portion of data 220. For example, monitoring module 104 may detect and/or identify any create, read, write, delete, and/or security (e.g., change of permissions) requests initiated by the member in connection with data 220. In this example, monitoring module 104 may make and/or keep a record of such requests to facilitate generating baseline representation 120 of the member's access to data 220.

In another example, monitoring module 104 may track the number of unique files related to the organization that are accessed by the member per day. For example, monitoring module 104 may identify 25 different unclassified files and 13 different classified files accessed in one way or another by the member on a specific day. In this example, monitoring module 104 may make and/or keep a record indicating that the member accessed 25 different unclassified files and 13 different classified files on that day. Additionally or alternatively, monitoring module 104 may identify 3 different unclassified files and 176 classified files accessed by the member on another day and then make and/or keep a record of the same.

In a further example, monitoring module 104 may identify and/or determine the number of files related to the organization for which the member has read or write permissions. For example, monitoring module 104 may search data 220 for files on which the member is able to perform read and/or write operations. During this search, monitoring module 104 may identify and/or count the files for which the member has read and/or write permissions. Monitoring module 104 may then make and/or keep a record indicating and/or identifying those files or the number of files for which the member has read and/or write permissions.

In some examples, monitoring module 104 may track the number of alerts triggered in connection with the member's access to data 220 and/or the number of policy violations committed by the member while accessing data 220. Additionally or alternatively, monitoring module 104 may track the number of unique IP addresses with which the member accesses data 220. For example, monitoring module 104 may detect each time that the member accesses any portion of data 220. In this example, monitoring module 104 may identify the IP address assigned to the computing device used by the member to access data 220. Moreover, monitoring module 104 may make and/or keep a record indicating and/or identifying all of the IP addresses by which the member accessed data 220 or the number of IP addresses with which the member accessed data 220.

In one example, monitoring module 104 may continuously monitor the computing activity of the member on an ongoing basis. In another example, monitoring module 104 may monitor the computing activity of the member over only certain periods of time.

Returning to FIG. 3, at step 304 one or more of the systems described herein may generate a baseline representation of the member's access to the data related to the organization based at least in part on the member's computing activity. For example, baseline module 106 may, as part of one or more of computing devices 202(1)-(N), server 206, and/or storage device 208 in FIG. 2, generate baseline representation 120 of the member's access to data 220 based at least in part on the member's computing activity. In this example, baseline representation 120 may identify and/or represent how the member has interacted with and/or accessed data 220 historically and/or over a certain period of time.

The systems described herein may perform step 304 in a variety of ways. In one example, baseline module 106 may generate baseline representation 120 based at least in part on past attempts by the member to access data 220. For example, baseline module 106 may identify the member's attempts to access data 220 over the last 6 months by way of certain records made and/or kept during the monitoring of the member's computing activity. In this example, baseline module 106 may generate baseline representation 120 at least in part from the member's past access attempts identified by way of those records.

As a specific example, baseline module 106 may generate baseline representation 120 in FIG. 4 based at least in part on the member's computing activity. As illustrated in FIG. 4, baseline representation 120 may identify the name of the corresponding member of an organization (in this case, "John Doe"), the period of time for which the member's computing activity is represented (in this case, "Last Six Months"), the opcodes detected in connection with the member's computing activity involving unclassified files (in this case, "Read, Write, Create"), the opcodes detected in connection with the member's computing activity involving classified files (in this case, "Read, Write"), the number of files for which the member has read and/or write permissions (in this case, "10,015"), the number of distinct unclassified files accessed over the represented period of time (in this case, "950"), the number of distinct classified files accessed over the represented period of time (in this case, "425"), the member groups that include the corresponding member (in this case, "Engineering Department"), and the number of IP addresses used by the corresponding member in accessing data (in this case, "3").

Returning to FIG. 3, at step 306 one or more of the systems described herein may detect at least one attempt by the member to access at least a portion of the data related to the organization. For example, detection module 108 may, as part of one or more of computing devices 202(1)-(N), server 206, and/or storage device 208 in FIG. 2, detect at least one attempt by the member to access at least a portion of data 220. In this example, the access attempt may include and/or represent an I/O request and/or operation directed to that portion of data 220.

The systems described herein may perform step 306 in a variety of ways. In one example, detection module 108 may monitor the computing activity of the member by detecting and/or tracking attempts by the member to access data 220. While monitoring the computing activity of the member in this way, detection module 108 may detect an attempt by the member to access data 220. Detection module 108 may perform this detection before, after, or during the member's attempt to access data 220.

As a specific example, detection module 108 may detect an I/O request originating from one of computing devices 202(1)-(N) operated by the member. In this example, the I/O request may include a "delete" opcode that is directed to a classified file within data 220.

Returning to FIG. 3, at step 308 one or more of the systems described herein may determine that the member's attempt to access the portion of data represents an anomaly that is suspiciously inconsistent with the baseline representation. For example, determination module 110 may, as part of one or more of computing devices 202(1)-(N), server 206, and/or storage device 208 in FIG. 2, determine that the member's attempt to access the portion of data 220 represents an anomaly that is suspiciously inconsistent with baseline representation 120. In other words, determination module 110 may determine that the anomalous access attempt indicates and/or suggests a certain degree of suspicion due at least in part to the level of inconsistency between the access attempt and baseline representation 120.

The systems described herein may perform step 308 in a variety of ways. In one example, determination module 110 may identify an amount of deviation (e.g., standard deviation, low deviation, medium deviation, and/or high deviation) between the member's attempt to access the portion of data 220 and baseline representation 120. In this example, determination module 110 may determine, based at least in part on the amount of deviation, that the member's attempt to access the portion of data 220 represents an anomaly. For example, determination module 110 may determine that the amount of deviation between the member's attempt to access portion of data 220 and baseline representation 120 exceeds a certain threshold.

In one example, determination module 110 may calculate a risk score for the member based at least in part on the amount of deviation. In this example, the risk score may represent the degree of risk posed by the member to the security of data 220. Determination module 110 may determine that the risk score for the member is above a riskiness threshold.

In one example, determination module 110 may determine the current computing activity of the member based at least in part on the member's attempt to access the portion of data 220. For example, determination module 110 may identify the member's attempts to access data 220 over the last 15 days by way of certain records collected during the monitoring of the member's computing activity. In this example, one of the access attempts may be the above-described I/O request that includes the "delete" opcode directed to a classified file within data 220.

In one example, determination module 110 may identify one or more characteristics of the member's current computing activity. Examples of such characteristics include, without limitation, opcodes recently identified in connection with the member's computing activity, classified and/or unclassified files that the member is attempting to access, the number of classified and/or unclassified files that the member has recently attempted to access, alerts recently triggered by the member's current computing activity, policy violations recently committed by the member's current computing activity, IP addresses assigned to any computing devices used recently by the member to access data related to the organization, variations or combinations of one or more of the same, or any other suitable characteristics of the member's current computing activity.

As a specific example, determination module 110 may take into account various characteristics of the member's current and/or recent computing activity in comparison with and/or in view of the member's previous computing activity (as represented, e.g., in baseline representation 120). For example, determination module 110 may determine the number of shared data containers, folders, and/or files of the organization on which the member has read and/or write permissions. Determination module 110 may then calculate a score and/or value that represents the level of risk or suspicion arising from the member having those read and/or write permissions.

Continuing with this example, determination module 110 may also determine the amount of deviation between the types of opcodes detected in the member's recent computing activity versus the member's previous computing activity (as represented, e.g., in baseline representation 120). For example, determination module 110 may determine that the member accessed classified files within data 220 over the last 15 days using read, write, delete, create, and security (e.g., change of permissions) opcodes, but the member accessed such classified files over the preceding 6 months using only read and write opcodes. Determination module 110 may then calculate a score and/or value that represents the level of risk or suspicion arising from the deviation of opcodes detected in the member's recent computing activity involving classified files.

Additionally or alternatively, determination module 110 may determine that the member accessed unclassified files within data 220 over the last 15 days using read, write, delete, create, and security (e.g., change of permissions) opcodes, but the member accessed such unclassified files over the preceding 6 months using only read, write, and create opcodes. Determination module 110 may then calculate a score and/or value that represents the level of risk or suspicion arising from the deviation of opcodes detected in the member's recent computing activity involving unclassified files.

Moreover, determination module 110 may determine the amount of deviation between the number of distinct classified and/or unclassified files accessed by the member within the last 15 days versus the last 6 months. Determination module 110 may then calculate a score and/or value that represents the level of risk or suspicion arising from the deviation in the number of distinct classified and/or unclassified files accessed by the member within the last 15 days versus the last 6 months.

Further, determination module 110 may determine the severity (e.g., low, medium, and/or high severity) and/or number of policy violations committed by the member while accessing data 220 over the last 15 days. Determination module 110 may then calculate a score and/or value that represents the level of risk or suspicion arising from the severity and/or number of such policy violations.

Determination module 110 may also determine the number of shares, folders, data containers, and/or files accessed by the member for the first time over the last 15 days. Determination module 110 may then calculate a score and/or value that represents the level of risk or suspicion arising from the member having accessed those shares, folders, data containers, and/or files for the first time over the last 15 days.

Determination module 110 may additionally determine that the member represented part of a minority community when he or she accessed a share, folder, data container, and/or file within data 220. For example, FIG. 5 illustrates an exemplary system 500 that includes member groups 504 and 508. In this example, member group 504 may include members 502(1)-(N) that have authorization to access files 510, 512, and 514 within data 220, and member group 508 may include members 506(1)-(N) that have authorization to access files 510, 512, and 514 within data 220. Each of members 502(1)-(N) included in member group 504 may have recently accessed files 514 within data 220. However, while each of members 506(1)-(N) included in member group 508 may have accessed files 512 within data 220, member 506(1) may be the only one from member group 508 to access files 514.

As a specific example, member 506(1) may belong to the organization's engineering department, which (for one reason or another) has read and/or write permissions on a share, folder, data container, and/or file accessed almost exclusively by members 502(1)-(N) of the organization's legal department. In this example, member 506(1) may be the only one from the engineering department to access that particular share, folder, data container, and/or file that is closely associated with the legal department. Determination module 110 may then calculate a score and/or value that represents the level of risk or suspicion arising from member 506(1) being the only one from the engineering department to access that particular share, folder, data container, and/or file.

In one example, determination module 110 may calculate an overall risk score for the member that represents the degree of risk posed by the member to the security of data 220 using any or all of the above-described factors. For example, determination module 110 may apply a mathematical formula that accounts for certain characteristics of the member's recent computing activity (such as amount of deviation, scores, opcodes, number of unique files accessed, read or write permissions, number of alerts, number of policy violations, number of unique IP addresses, minority status, etc.) in view of baseline representation 120. In this example, determination module 110 may weight one or more of the numerical scores and/or values that represent those characteristics such that the weighted scores and/or values are more or less influential to the result of the calculation. Determination module 110 may then determine that the overall risk score for the member is above a riskiness threshold. As a result, determination module 110 may determine that the member's recent computing activity is anomalous and/or suspiciously inconsistent with baseline representation 120.

Returning to FIG. 3, at step 310 one or more of the systems described herein may classify the member as a potential risk to the security of the data related to the organization in response to determining that the member's attempt to access the portion of data represents an anomaly. For example, classification module 112 may, as part of one or more of computing devices 202(1)-(N), server 206, and/or storage device 208 in FIG. 2, classify the member as a potential risk to the security of data 220. In this example, the classification of a potential risk may indicate and/or suggest that the member is more likely to perpetrate an insider attack on the organization's data than other members of the organization.

The systems described herein may perform step 310 in a variety of ways. In one example, classification module 112 may mark the member's account and/or records within the organization. In another example, classification module 112 may restrict and/or block the member's access to certain portions of data 220. In a further example, classification module 112 may ensure that the member's computing activity is monitored and/or reviewed with stricter scrutiny. Additionally or alternatively, classification module 112 may notify and/or warn the member and/or organization that the member has been classified as a potential risk.

Accordingly, the various systems and methods described herein may identify and/or classify users as having a high likelihood of malicious intentions and/or posing a real threat to the security of an organization's data. By identifying and/or classifying users with malicious intentions in this way, these systems and methods may facilitate mitigating, thwarting, and/or undermining the negative impact of insider attacks on the organization.

Figure 6:
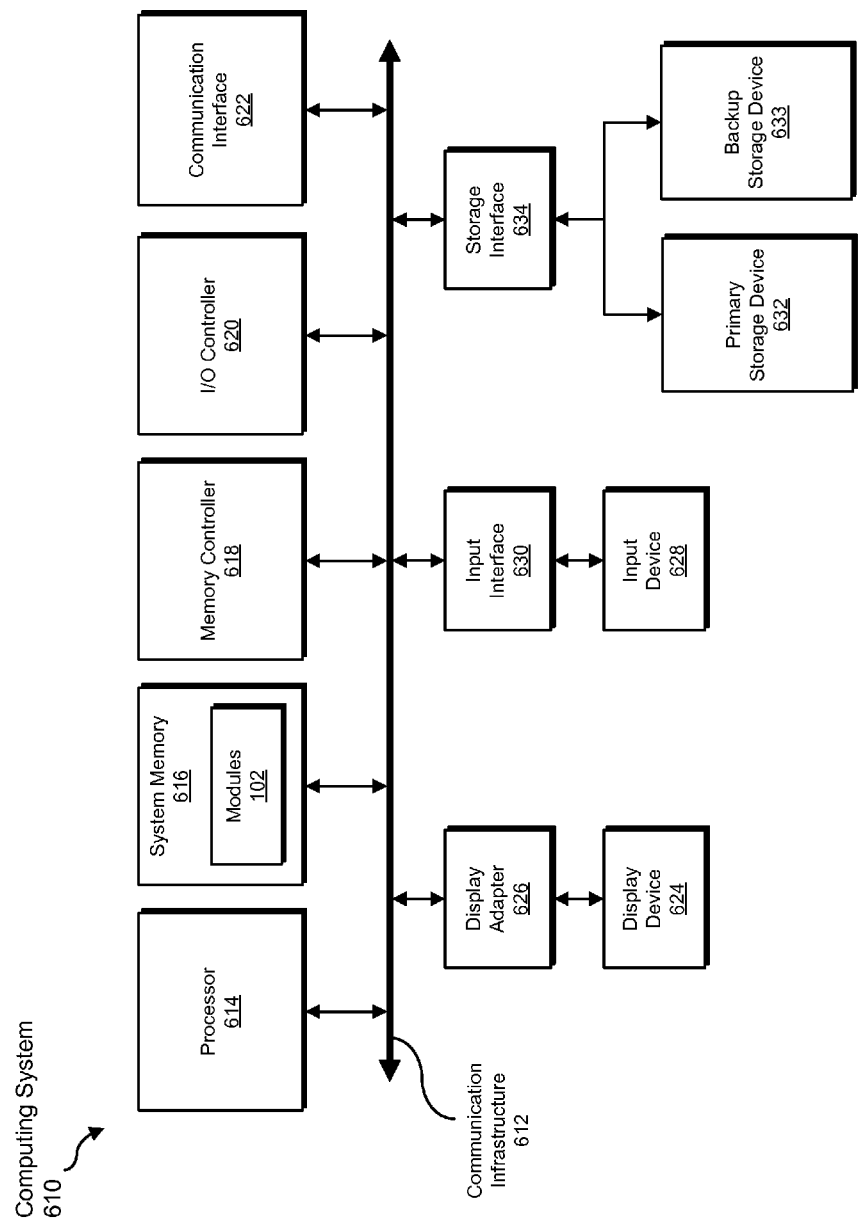
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an I/O controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
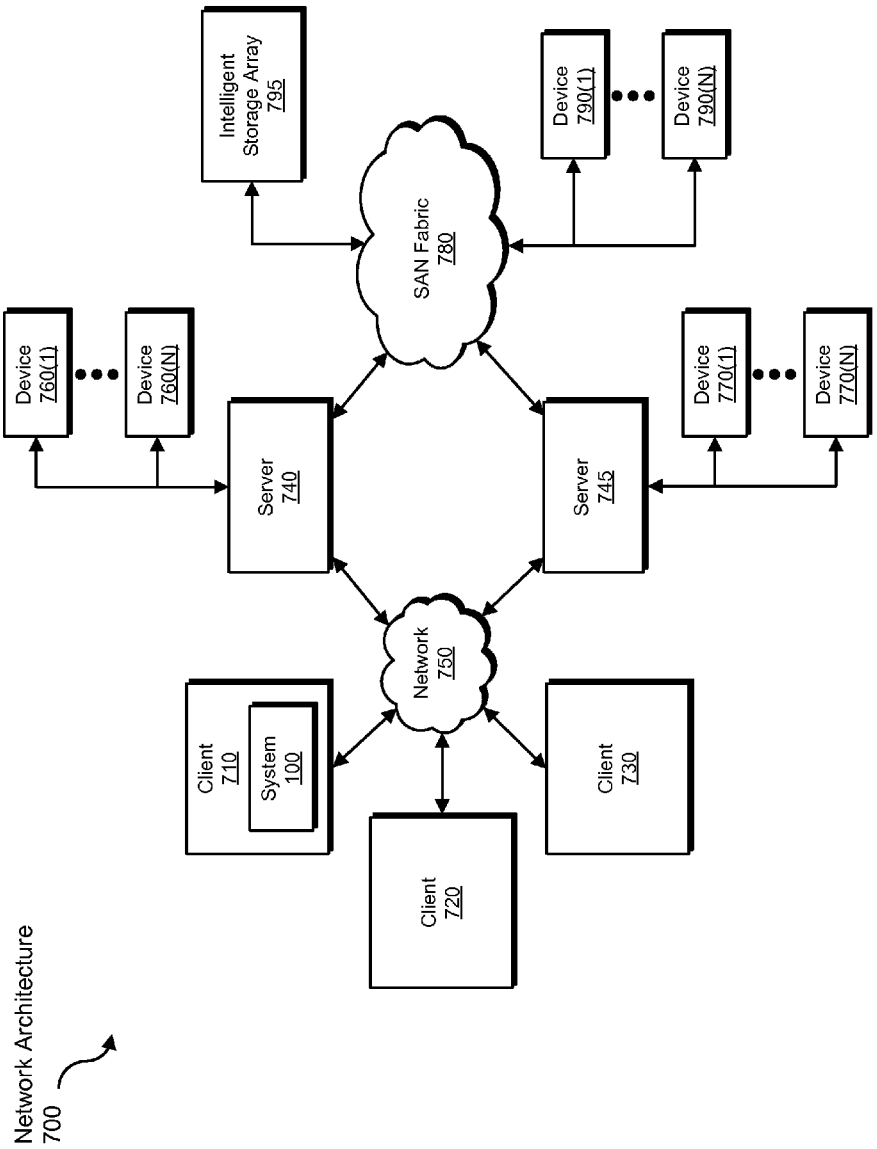
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for identifying potentially risky data users within organizations.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for identifying potentially risky data users within organizations, at least a portion of the method being performed by a computing device comprising at least one processor, the method comprising:
    monitoring computing activity of at least one member of an organization with respect to the member's access to data related to the organization;
    generating, based at least in part on the member's computing activity, a baseline representation of the member's access to the data related to the organization;
    detecting at least one attempt by the member to access at least a portion of the data related to the organization;
    determining that the member's attempt to access the portion of data represents an anomaly that is suspiciously inconsistent with the baseline representation by:
        identifying an amount of deviation between the member's attempt to access the portion of data and the baseline representation by:
            determining current computing activity of the member based at least in part on the member's attempt to access the portion of data;
            identifying one or more characteristics of the member's current computing activity;
            determining, by comparing the member's current computing activity with the baseline representation, the amount of deviation between at least one of the characteristics of the member's current computing activity and the baseline representation;
        calculating, based at least in part on the amount of deviation, a risk score for the member that represents a degree of risk posed by the member to the security of the data, wherein calculating the risk score comprises weighting, within a mathematical formula, a numerical value that represents the amount of deviation between the at least one of the characteristics of the member's current computing activity and the baseline representation;
        determining that the risk score for the member is above a riskiness threshold;
    in response to determining that the member's attempt to access the portion of data represents the anomaly, classifying the member as a potential risk to the security of the data related to the organization.

2. The method of claim 1, wherein monitoring the computing activity of the member of the organization comprises at least one of:
    tracking opcodes identified in connection with the member's access to the data related to the organization;
    tracking the number of unique files related to the organization that are accessed by the member per day;
    identifying the number of files related to the organization for which the member has read or write permissions;
    tracking the number of alerts triggered in connection with the member's access to the data related to the organization;
    tracking the number of policy violations committed by the member while accessing the data related to the organization;
    tracking the number of unique Internet Protocol (IP) addresses with which the member accesses the data related to the organization.

3. The method of claim 1, wherein determining that the member's attempt to access the portion of data represents the anomaly comprises:
    identifying at least one member group of the organization that includes the member;
    identifying the number of members from the member group that have accessed the portion of data;
    determining that the number of members from the member group that have accessed the portion of data is below a minority threshold.

4. The method of claim 1, wherein generating the baseline representation comprises:
    identifying past attempts by the member to access the data related to the organization over a certain period of time;

generating, based at least in part on the past attempts by the member to access the data over the certain period of time, a baseline representation of the member's access to the data related to the organization.

5. The method of claim 4, wherein determining that the member's attempt to access the portion of data represents the anomaly comprises:
identifying recent attempts by the member to access the data related to the organization over a recent period of time, the recent attempts including the member's attempt to access the portion of data;
comparing the recent attempts by the member to access the data related to the organization with the baseline representation;
identifying, based at least in part on the comparison, an amount of deviation between the recent attempts by the member to access the portion of data and the baseline representation;
determining, based at least in part on the amount of deviation, that at least a portion of the recent attempts by the member to access the data are anomalous due at least in part to the portion of recent attempts being suspiciously inconsistent with the baseline representation.

6. The method of claim 5, wherein:
identifying the recent attempts by the member to access the data related to the organization comprises identifying the number of policy violations committed by the member while accessing the data related to the organization over the recent period of time;
determining that the member's attempt to access the portion of data represents the anomaly comprises determining, based at least in part on the number of policy violations, that at least a portion of the recent attempts by the member to access the data are anomalous.

7. The method of claim 1, wherein determining that the member's attempt to access the portion of data represents the anomaly comprises determining that the member's attempt to access the portion of data represents the anomaly based on at least one of:
an opcode identified in connection with the member's attempt to access the portion of data;
a file that the member is attempting to access;
an alert triggered in connection with the member's attempt to access the portion of data;
a policy violation committed in connection with the member's attempt to access the portion of data;
an IP address with which the member accesses the data related to the organization.

8. A system for identifying potentially risky data users within organizations, the system comprising:
a monitoring module, stored in memory, that monitors computing activity of at least one member of an organization with respect to the member's access to data related to the organization;
a baseline module, stored in memory, that generates, based at least in part on the member's computing activity, a baseline representation of the member's access to the data related to the organization;
a detection module, stored in memory, that detects at least one attempt by the member to access at least a portion of the data related to the organization;
a determination module, stored in memory, that determines that the member's attempt to access the portion of data represents an anomaly that is suspiciously inconsistent with the baseline representation by:
identifying an amount of deviation between the member's attempt to access the portion of data and the baseline representation by:
determining current computing activity of the member based at least in part on the member's attempt to access the portion of data;
identifying one or more characteristics of the member's current computing activity;
determining, by comparing the member's current computing activity with the baseline representation, the amount of deviation between at least one of the characteristics of the member's current computing activity and the baseline representation;
calculating, based at least in part on the amount of deviation, a risk score for the member that represents a degree of risk posed by the member to the security of the data, wherein calculating the risk score comprises weighting, within a mathematical formula, a numerical value that represents the amount of deviation between the at least one of the characteristics of the member's current computing activity and the baseline representation;
determining that the risk score for the member is above a riskiness threshold;
a classification module, stored in memory, that classifies the member as a potential risk to the security of the data related to the organization in response to the determination that the member's attempt to access the portion of data represents the anomaly;
at least one physical processor that executes the monitoring module, the baseline module, the detection module, the determination module, and the classification module.

9. The system of claim 8, wherein the monitoring module monitors the computing activity of the member of the organization by at least one of:
tracking opcodes identified in connection with the member's access to the data related to the organization;
tracking the number of unique files related to the organization that are accessed by the member per day;
identifying the number of files related to the organization for which the member has read or write permissions;
tracking the number of alerts triggered in connection with the member's access to the data related to the organization;
tracking the number of policy violations committed by the member while accessing the data related to the organization;
tracking the number of unique IP addresses with which the member accesses the data related to the organization.

10. The system of claim 8, wherein the determination module:
identifies at least one member group of the organization that includes the member;
identifies the number of members from the member group that have accessed the portion of data;
determines that the number of members from the member group that have accessed the portion of data is below a minority threshold.

11. The system of claim 8, wherein the baseline module:
identifies past attempts by the member to access the data related to the organization over a certain period of time;
generates, based at least in part on the past attempts by the member to access the data over the certain period of time, a baseline representation of the member's access to the data related to the organization.

12. The system of claim 11, wherein the determination module:
- identifies recent attempts by the member to access the data related to the organization over a recent period of time, the recent attempts including the member's attempt to access the portion of data;
- compares the recent attempts by the member to access the data related to the organization with the baseline representation;
- identifies, based at least in part on the comparison, an amount of deviation between the recent attempts by the member to access the portion of data and the baseline representation;
- determines, based at least in part on the amount of deviation, that at least a portion of the recent attempts by the member to access the data are anomalous due at least in part to the portion of recent attempts being suspiciously inconsistent with the baseline representation.

13. The system of claim 8, wherein the determination module:
- identifies the number of policy violations committed by the member while accessing the data related to the organization over the recent period of time;
- determines, based at least in part on the number of policy violations, that at least a portion of the recent attempts by the member to access the data are anomalous.

14. A non-transitory computer-readable medium comprising one or more computer-executable instructions that, when executed by at least one processor of a computing device, cause the computing device to:
- monitor computing activity of at least one member of an organization with respect to the member's access to data related to the organization;
- generate, based at least in part on the member's computing activity, a baseline representation of the member's access to the data related to the organization;
- detect at least one attempt by the member to access at least a portion of the data related to the organization;
- determine that the member's attempt to access the portion of data represents an anomaly that is suspiciously inconsistent with the baseline representation by:
  - identifying an amount of deviation between the member's attempt to access the portion of data and the baseline representation by:
    - determining current computing activity of the member based at least in part on the member's attempt to access the portion of data;
    - identifying one or more characteristics of the member's current computing activity;
    - determining, by comparing the member's current computing activity with the baseline representation, the amount of deviation between at least one of the characteristics of the member's current computing activity and the baseline representation;
  - calculating, based at least in part on the amount of deviation, a risk score for the member that represents a degree of risk posed by the member to the security of the data, wherein calculating the risk score comprises weighting, within a mathematical formula, a numerical value that represents the amount of deviation between the at least one of the characteristics of the member's current computing activity and the baseline representation;
  - determining that the risk score for the member is above a riskiness threshold;
- in response to the determination that the member's attempt to access the portion of data represents the anomaly, classify the member as a potential risk to the security of the data related to the organization.

* * * * *

UNITED STATES PATENT AND TRADEMARK OFFICE
CERTIFICATE OF CORRECTION

PATENT NO. : 9,900,330 B1
APPLICATION NO. : 14/941527
DATED : February 20, 2018
INVENTOR(S) : Dargude et al.

Page 1 of 1

It is certified that error appears in the above-identified patent and that said Letters Patent is hereby corrected as shown below:

On the Title Page

Item (71), under "Applicant", in Column 1, Line 1, delete "Veritas Technologies," and insert -- Veritas Technologies LLC, --, therefor.

Item (72), under "Inventors", in Column 1, Line 1, delete "Milpiltas," and insert -- Milpitas, --, therefor.

Signed and Sealed this
Fourth Day of September, 2018

Andrei Iancu
*Director of the United States Patent and Trademark Office*